United States Patent
Lee et al.

(10) Patent No.: US 11,603,909 B2
(45) Date of Patent: Mar. 14, 2023

(54) POWER TRANSMISSION APPARATUS FOR ELECTRIC VEHICLE

(71) Applicants: Hyundai Motor Company, Seoul (KR); Kia Corporation, Seoul (KR)

(72) Inventors: Sueng Ho Lee, Seoul (KR); Byunghoon Yang, Seongnam-si (KR); Jihyun Park, Hwaseong-si (KR); Cheolho Jang, Hwaseong-si (KR); Minsu Kim, Busan (KR); Jeong Soo Park, Cheongju-si (KR); Jeong Mo Jang, Yongin-si (KR); Yoh Han Kim, Seoul (KR); Weon Jae Lee, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/545,824

(22) Filed: Dec. 8, 2021

(65) Prior Publication Data
US 2023/0019269 A1    Jan. 19, 2023

(30) Foreign Application Priority Data
Jul. 14, 2021    (KR) .................. 10-2021-0091990

(51) Int. Cl.
   *F16H 1/46*    (2006.01)
   *B60K 1/02*    (2006.01)
   (Continued)

(52) U.S. Cl.
   CPC ............ *F16H 1/46* (2013.01); *B60K 1/02* (2013.01); *F16D 21/00* (2013.01); *F16H 3/728* (2013.01);
   (Continued)

(58) Field of Classification Search
   CPC ...... B60K 2007/003–0092; B60K 1/02; B60K 17/046; F16H 2200/2007–2017;
   (Continued)

(56) References Cited

U.S. PATENT DOCUMENTS 9,840,140 B1 *    12/2017    Holmes .................. B60K 6/387
2018/0298994 A1 *    10/2018    Lian ....................... B60K 6/387
(Continued)

*Primary Examiner* — Charles A Fox
*Assistant Examiner* — Farhana Pervin
(74) *Attorney, Agent, or Firm* — Morgan, Lewis & Bockius LLP

(57) ABSTRACT

A power transmission apparatus may include a first motor-generator including a first stator fixed to a first housing, and a first rotor; a second motor-generator including a second stator fixed to a second housing and a second rotor; a first planetary gear set including first and third rotation elements connected to the first rotor and a first wheel, respectively, and a third rotation element; a second planetary gear set including fourth, fifth and sixth rotation elements connected to the second rotor, a second wheel, and the third rotation element, respectively; a first clutch selectively locking up the first planetary gear set by selectively connecting two out of the first to third rotation elements; a second clutch selectively locking up the second planetary gear set by selectively connecting two of the fourth to sixth rotation elements; and a brake selectively fixing the third and sixth rotation elements to a third housing.

18 Claims, 5 Drawing Sheets

(51) Int. Cl.
  *F16D 21/00*    (2006.01)
  *F16H 3/72*     (2006.01)
  *B60K 7/00*     (2006.01)
  *B60K 17/04*    (2006.01)

(52) U.S. Cl.
  CPC .... *B60K 17/046* (2013.01); *B60K 2007/0038* (2013.01); *B60K 2007/0061* (2013.01)

(58) Field of Classification Search
  CPC ..... F16H 2200/2038; F16H 2200/2041; F16H 3/728; F16H 3/724; F16H 1/46; F16D 21/00
  See application file for complete search history.

(56) References Cited

U.S. PATENT DOCUMENTS

2019/0176609 A1\* 6/2019 Bando ................. B60K 17/356
2019/0344660 A1\* 11/2019 Kumar ................. B60K 7/0007

\* cited by examiner

FIG. 2

○ : Engaged
× : Disengaged

| Operation | 20a | 20b | BK | CL1 | CL2 | SYN |
|---|---|---|---|---|---|---|
| Stop | Off | Off | ○ | ○ | ○ | × |
| | Off | Off | × | × | × | × |
| Start movement | On | On | ○ | × | × | ○ |
| Acceleration | On | On | × | ○ | ○ | ○ |
| Traveling at constant speed | On | Off | × | ○ | ○ | × |
| | On | On | × | ○ | ○ | ○ |
| Regenerative braking | On | Off | × | ○ | ○ | × |
| | On | On | × | ○ | ○ | ○ |
| Turning (low speed) | On | On | ○ | × | × | ○ |
| Turning (high speed) | On | On | × | × | × | ○ |
| Parking | Off | Off | ○ | ○ | ○ | × |
| Rearward movement | On | On | ○ | × | × | ○ |

POWER TRANSMISSION APPARATUS FOR ELECTRIC VEHICLE

CROSS-REFERENCE TO RELATED APPLICATION

The present application claims priority to Korean Patent Application No. 10-2021-0091990 filed on Jul. 14, 2021, the entire contents of which is incorporated herein for all purposes by this reference.

BACKGROUND OF THE INVENTION

Field of the Invention

The present invention relates to a power transmission apparatus of an electric vehicle, and more particularly, to a power transmission apparatus of an electric vehicle, which utilizes two motors, which makes it possible to apply various control strategies, improve fuel economy, and implement excellent durability.

Description of Related Art

An environment-friendly technology of vehicles is a key technology that dictates the survival of the future vehicle industry, and advanced vehicle manufacturers have made a great effort to develop environment-friendly vehicles to meet regulations associated with environments and fuel economy.

Therefore, the vehicle manufacturers develop electric vehicles (EVs), hybrid electric vehicles (HEVs), fuel cell electric vehicles (FCEVs), and the like as future vehicles.

Recently, as production and sales of the electric vehicles are increased, the vehicle manufacturers accelerate the development of various technologies, such as technologies related to speed reducers, multi-stage technologies, and in-wheel technologies which may be applied to the electric vehicles.

The information disclosed in this Background of the Invention section is only for enhancement of understanding of the general background of the invention and may not be taken as an acknowledgment or any form of suggestion that this information forms the prior art already known to a person skilled in the art.

BRIEF SUMMARY

Various aspects of the present invention are directed to providing a power transmission apparatus of an electric vehicle, which utilizes two motors, which makes it possible to apply various control strategies.

Various aspects of the present invention are directed to providing a power transmission apparatus of an electric vehicle, the power transmission apparatus including: a first motor-generator including a first stator fixed to a first housing, and a first rotor rotatably disposed in the first stator; a second motor-generator including a second stator fixed to a second housing, and a second rotor rotatably disposed in the second stator; a first planetary gear set including a first rotation element connected to the first rotor, a second rotation element connected to a first wheel, and a third rotation element; a second planetary gear set including a fourth rotation element connected to the second rotor, a fifth rotation element connected to a second wheel, and a sixth rotation element connected to the third rotation element; a first clutch configured to selectively lock up the first planetary gear set by selectively connecting two rotation elements among the first, second, and third rotation elements; a second clutch configured to selectively lock up the second planetary gear set by selectively connecting two rotation elements among the fourth, fifth, and sixth rotation elements; and a brake configured to selectively fix the connected third and sixth rotation elements to a third housing.

The first and second wheels may be a pair of front wheels of the vehicle, and the power transmission apparatus may be disposed between the first and second wheels.

The first housing and the first motor-generator may form a first motor module, the second housing and the second motor-generator may form a second motor module, and the first planetary gear set and the second planetary gear set, the first and second clutches, the brake, and the third housing may form a gear module.

The gear module may be disposed between the first and second motor modules.

The power transmission apparatus may further include a synchronous device disposed between the first rotation element and the first rotor or between the fourth rotation element and the second rotor.

The synchronous device may be a dog clutch or a synchronizer.

The first planetary gear set and the second planetary gear set may each be a single pinion planetary gear set, the first rotation element may be a first sun gear, the second rotation element may be a first planet carrier, the third rotation element may be a first ring gear, the fourth rotation element may be a second sun gear, the fifth rotation element may be a second planet carrier, and the sixth rotation element may be a second ring gear.

The first ring gear and the second ring gear may be integrated.

The first clutch may selectively connect the first planet carrier and the first ring gear, and the second clutch may selectively connect the second planet carrier and the second ring gear.

The first planetary gear set and the second planetary gear set may each be a double pinion planetary gear set, the first rotation element may be a first sun gear, the second rotation element may be a first ring gear, the third rotation element may be a first planet carrier, the fourth rotation element may be a second sun gear, the fifth rotation element may be a second ring gear, and the sixth rotation element may be a second planet carrier.

The first clutch may selectively connect the first sun gear and the first ring gear, and the second clutch may selectively connect the second sun gear and the second ring gear.

The first, second, and third housing may be assembled with one another as a single housing.

According to the exemplary embodiment of the present invention, the two motors are connected to the two planetary gear sets. Therefore, it is possible to design the power transmission apparatus with the excellent degree of design freedom by applying a safety factor implemented in consideration of durability.

The module structure configured for freely selecting performance of the motor may be manufactured and applied to various vehicles that require various performances.

The power transmission apparatus may be mounted in the engine compartment in the related art, which reduces limitations to available motors and gearboxes. Therefore, the power transmission apparatus may be applied to various vehicles that require various performances.

The mechanical components implement the differential operation and torque vectoring, which makes it possible to obtain stable and excellent turning ability.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a table showing operations of the power transmission apparatus of an electric vehicle according to the first exemplary embodiment of the present invention.

Figure 1:
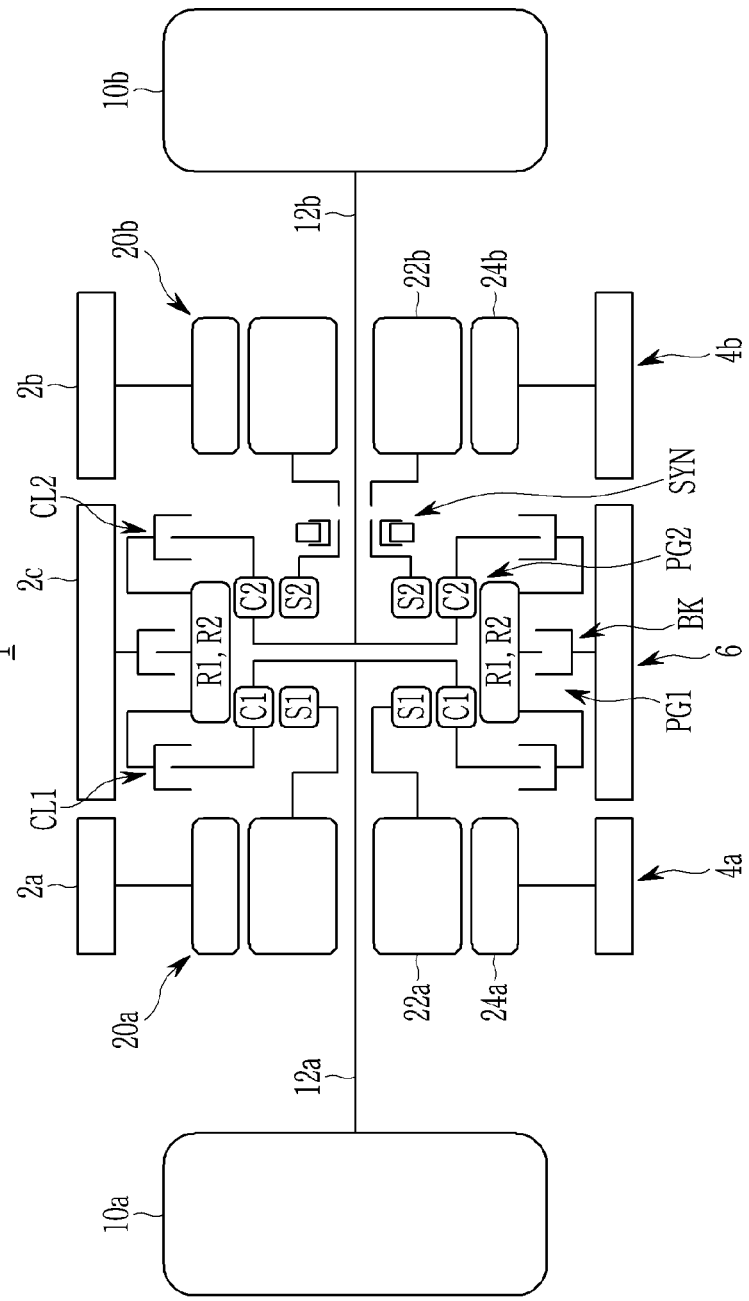
FIG. 1 is a configuration view exemplarily illustrating a power transmission apparatus of an electric vehicle according to a first exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

The terms used herein are merely for the purpose of describing a specific embodiment, and not intended to limit the present invention. The singular expressions used herein are intended to include the plural expressions unless the context clearly dictates otherwise. It is to be understood that the term "comprise (include)" and/or "comprising (including)" used in the present specification means that the features, the integers, the steps, the operations, the constituent elements, and/or component are present, but the presence or addition of one or more of other features, integers, steps, operations, constituent elements, components, and/or groups thereof is not excluded. The term "and/or" used herein includes any one or all the combinations of listed related items.

It is understood that the term "vehicle" or "vehicular" or another similar term used herein includes passenger vehicles including sports utility vehicles (SUVs), buses, trucks, and various commercial vehicles as well as railroad vehicles. Furthermore, the vehicles may include hybrid vehicles.

The term "electric vehicle" or another similar term used in the exemplary embodiment of the present invention refers to a vehicle operated by one or more motor-generators.

The term "operably connected" or another similar term used in the exemplary embodiment means that at least two members are directly connected or indirectly to each other. The two members, which are operably connected to each other, do not always rotate at the same speed and in the same direction thereof. When one member operably connected rotates, the other member operably connected also rotates. Unless the context clearly dictates otherwise, the configuration in which the two members are connected to each other means that the two members are operably connected to each other.

The term "directly connected" or another similar term means that at least two members are always operably connected to each other.

Furthermore, the term "selectively connectable" or another similar term means that at least two members are operably connected to each other or disconnected from each other by operation of a coupling element (e.g., a synchronizer, a dog clutch, a clutch, a brake, or the like). That is, when the coupling element selectively connects the two members, the coupling element operates, and the two members are operably connected to each other. However, when the coupling element is released, the two members are disconnected from each other.

Therefore, it may be understood by those skilled in the art that the term "selective connection" or another similar term is different from the term "operable connection" or another similar term and the term "direct connection" or another similar term.

Hereinafter, embodiments of the present invention will be described below in detail with reference to the accompanying drawings.

FIG. 1 is a configuration view exemplarily illustrating a power transmission apparatus of an electric vehicle according to various exemplary embodiments of the present invention.

As illustrated in FIG. 1, a power transmission apparatus 1 for an electric vehicle according to various exemplary embodiments of the present invention are disposed between first and second wheels 10*a* and 10*b* of a vehicle which are spaced from each other. The first and second wheels 10*a* and 10*b* may be a pair of front wheels or a pair of rear wheels. When the power transmission apparatus 1 is disposed between the pair of front wheels 10*a* and 10*b*, the power transmission apparatus 1 may be mounted in an engine compartment.

The power transmission apparatus 1 includes first and second motor modules 4*a* and 4*b*, and a gear module 6 disposed between the first and second motor modules 4*a* and 4*b*. Since the power transmission apparatus 1 includes the first and second motor modules 4*a* and 4*b* and the gear module 6, the power transmission apparatus 1 is conveniently assembled. Furthermore, the power transmission apparatus 1 may be assembled by replacing some modules in accordance with performance required for the vehicle. Therefore, the power transmission apparatus 1 may be applied to various vehicles requiring various performances.

The first motor module 4a includes a first housing 2a and a first motor-generator 20a.

The first housing 2a may be a separate housing for the first motor module 4a. For example, the first housing 2a may be a motor housing or a structure such as a vehicle body fixed in the vehicle.

The first motor-generator 20a is disposed in the first housing 2a and includes a first rotor 22a and a first stator 24a. The first rotor 22a has a shape of cylinder and is rotatably disposed in the first housing 2a. The first stator 24a surrounds the first rotor 22a and is fixed to the first housing 2a. When electric current is applied to the first stator 24a, the first stator 24a generates a magnetic field, and the first rotor 22a generates driving power by being rotated by the magnetic field. A first hollow motor shaft is connected to the first rotor 22a and extends toward the gear module 6.

The second motor module 4b includes a second housing 2b and a second motor-generator 20b.

The second housing 2b may be a separate housing for the second motor module 4b. For example, the second housing 2b may be a motor housing or a structure such as a vehicle body fixed in the vehicle.

The second motor-generator 20b is disposed in the second housing 2b and includes a second rotor 22b and a second stator 24b. The second rotor 22b has a shape of cylinder and is rotatably disposed in the second housing 2b. The second stator 24b surrounds the second rotor 22b and is fixed to the second housing 2b. When electric current is applied to the second stator 24b, the second stator 24b generates a magnetic field, and the second rotor 22b generates driving power by being rotated by the magnetic field. A second hollow motor shaft is connected to the second rotor 22b and extends toward the gear module 6.

The gear module 6 includes a third housing 2c and first and second planetary gear sets PG1 and PG2.

The third housing 2c may be a separate housing for the gear module 6 or a structure such as a vehicle body fixed in the vehicle. The present invention is not limited thereto, and the first, second, and third housings 2a, 2b, and 2c may be assembled with one another as a single housing.

The first planetary gear set PG1 is a single pinion planetary gear set including a first sun gear S1, a first planet carrier C1, and a first ring gear R1 as rotation elements. As well known to those skilled in the art, one set of pinion gears is rotatably disposed between the first sun gear S1 and the first ring gear R1 and engages with the first sun gear S1 and the first ring gear R1. The first planet carrier C1 rotatably supports the set of pinion gears. In the instant case, the first sun gear S1 is a first rotation element and is connected to the first rotor 22a through the first motor shaft. The first planet carrier C1 is a second rotation element and is connected to the first wheel 10a through a first output shaft 12a penetrating the first motor shaft and the first rotor 22a. The first planet carrier C1 is selectively connectable to the first ring gear R1 through a first clutch CL1. The first ring gear R1 is a third rotation element and is selectively connectable to the third housing 2c through a brake BK. In the instant case, the first clutch CL1 locks up the first planetary gear set PG1 by connecting the two rotation elements, e.g., the first planet carrier C1 and the first ring gear R1 of the first planetary gear set PG1.

The second planetary gear set PG2 is a single pinion planetary gear set including a second sun gear S2, a second planet carrier C2, and a second ring gear R2 as rotation elements. As well known to those skilled in the art, one set of pinion gears is rotatably disposed between the second sun gear S2 and the second ring gear R2 and engages with the second sun gear S2 and the second ring gear R2. The second planet carrier C2 rotatably supports the set of pinion gears. In the instant case, the second sun gear S2 is a fourth rotation element and is selectively connectable to the second rotor 22b through a synchronous device SYN. The second planet carrier C2 is a fifth rotation element is connected to the second wheel 10b through a second output shaft 12b penetrating the second motor shaft and the second rotor 22b. The second planet carrier C2 is selectively connectable to the second ring gear R2 through a second clutch CL2. The second ring gear R2 is a sixth rotation element and is selectively connectable to the third housing 2c through the brake BK. In the instant case, the second clutch CL2 locks up the second planetary gear set PG2 by connecting the two rotation elements, e.g., the second planet carrier C2 and the second ring gear R2 of the second planetary gear set PG2. Furthermore, the first ring gear R1 and the second ring gear R2 may be integrated and operated as a single common ring gear. However, the first ring gear R1 and the second ring gear R2 need not be necessarily integrated. The first ring gear R1 and the second ring gear R2 may be separately manufactured and then connected to each other. In the instant case, the synchronous device SYN may be a dog clutch, a synchronizer, or the like.

In the exemplary embodiment, the example has been described in which the second sun gear S2 is selectively connectable to the second rotor 22b through the synchronous device SYN. The second sun gear S2 may be connected to the second rotor 22b through the second motor shaft, and the first sun gear S1 may be selectively connectable to the first rotor 22a through the synchronous device SYN.

When at least one of the first and second motor-generators 20a and 20b generates driving power, the gear module 6 converts the driving power and transmits the converted power to the first and second wheels 10a and 10b through the first and second output shafts 12a and 12b.

Hereinafter, an operation of the power transmission apparatus of an electric vehicle according to the first exemplary embodiment of the present invention will be described in detail with reference to FIG. 2.

FIG. 2 is a table showing operations of the power transmission apparatus of an electric vehicle according to the first exemplary embodiment of the present invention.

Stop or Parking

As illustrated in FIG. 2, two stationary states of the electric vehicle may be implemented. In one stationary state, the first and second motor-generators 20a and 20b do not operate, the brake BK engages with the first clutch and second clutch CL1 and CL2, and the synchronous device SYN is disengaged. In the state in which the first clutch and second clutch CL1 and CL2 are engaged and the first planetary gear set and the second planetary gear set PG1 and PG2 are locked up, the brake BK operates, and all the rotation elements of the first planetary gear set and the second planetary gear set PG1 and PG2 are fixed to the third housing 2c. Therefore, the electric vehicle does not move even though a driver does not push a foot brake provided in a driver seat. Therefore, a parking mode of the electric vehicle may further be implemented in the present way.

In the other stationary state, the first and second motor-generators 20a and 20b do not operate, and the brake BK, the first clutch and second clutch CL1 and CL2, and the synchronous device SYN are disengaged. In the instant state, because the first and second planet carriers C1 and C2 connected to the first and second wheels 10a and 10b may be rotated, the driver may be required to push the foot brake provided in the driver seat. Therefore, the present stationary state implemented in the instant way may be used at the time of temporarily stopping the electric vehicle while the electric vehicle travels.

Start of Movement

At the time of starting the movement of the electric vehicle, the first and second motor-generators 20a and 20b operate in the state in which the synchronous device SYN is engaged, and the driving power is transmitted to the first and second sun gears S1 and S2 through the first and second motor shafts. In the instant case, the first clutch and second clutch CL1 and CL2 are not engaged, but the brake BK is engaged. Therefore, torque according to the driving power is increased by a gear ratio between the first planetary gear set and the second planetary gear set PG1 and PG2 and outputted to the first and second wheels 10a and 10b through the first and second planet carriers C1 and C2 and the first and second output shafts 12a and 12b.

Acceleration

At the time of accelerating the electric vehicle, the first and second motor-generators 20a and 20b operate in the state in which the synchronous device SYN is engaged, and the driving power is transmitted to the first and second sun gears S1 and S2 through the first and second motor shafts. In the instant case, the first clutch and second clutch CL1 and CL2 are engaged, and the brake BK is not engaged. The torque according to the driving power is outputted, without being converted, to the first and second wheels 10a and 10b through the first and second planet carriers C1 and C2 and the first and second output shafts 12a and 12b. In the instant case, a rotation speed of each of the first and second rotors 22a and 22b is equal to a rotation speed of each of the first and second wheels 10a and 10b.

Traveling at Constant Speed

When the electric vehicle travels at a constant speed, the brake BK is disengaged in the state in which the first clutch and second clutch CL1 and CL2 are engaged and the first planetary gear set and the second planetary gear set PG1 and PG2 are locked up.

In the present state, the first motor-generator 20a operates, but the second motor-generator 20b does not operate. When the synchronous device SYN is disengaged, the torque according to the driving power of the first motor-generator 20a is outputted, without being converted, to the first and second wheels 10a and 10b through the first and second planet carriers C1 and C2 and the first and second output shafts 12a and 12b. In the instant case, a rotation speed of the first rotor 22a is equal to a rotation speed of each of the first and second wheels 10a and 10b. The consumption of electrical energy may be reduced because the second motor-generator 20b does not operate while the electric vehicle travels at a constant speed in the present way.

Furthermore, the traveling of the electric vehicle at a constant speed may be implemented as the first and second motor-generators 20a and 20b operate in the state in which the first clutch and second clutch CL1 and CL2 are engaged, the brake BK is disengaged, and the synchronous device SYN is engaged. In the instant case, the torque according to the driving power of the first and second motor-generators 20a and 20b is outputted, without being converted, to the first and second wheels 10a and 10b through the first and second planet carriers C1 and C2 and the first and second output shafts 12a and 12b. In the instant case, a rotation speed of each of the first and second rotors 22a and 22b is equal to a rotation speed of each of the first and second wheels 10a and 10b.

Regenerative Braking

The regenerative braking of the electric vehicle is implemented in the same way as the traveling of the electric vehicle at a constant speed. However, the first motor-generator 20a and/or the second motor-generator 20b, which provides the driving power while the electric vehicle travels at a constant speed, generates electrical energy by charging the electric vehicle during the regenerative braking. That is, the first motor-generator 20a may generate electricity, and the second motor-generator 20b may be stopped, in the state in which the first clutch and second clutch CL1 and CL2 are engaged, the brake BK is disengaged, and the synchronous device SYN is disengaged. On the other hand, the first and second motor-generators 20a and 20b may generate electricity in the state in which the first clutch and second clutch CL1 and CL2 are engaged, the brake BK is disengaged, and the synchronous device SYN is engaged.

Turning at Low Speed

The electric vehicle may turn at a low speed as the first and second motor-generators 20a and 20b operate at different speeds in the state in which the first clutch and second clutch CL1 and CL2 are disengaged, the brake BK is engaged, and the synchronous device SYN is engaged. That is, in the state in which the brake BK is engaged and the first and second ring gears R1 and R2 are stopped, the driving power of the first motor-generator 20a is inputted to the first sun gear S1 and outputted to the first wheel 10a through the first planet carrier C1 and the first output shaft 12a, and the driving power of the second motor-generator 20b is inputted to the second sun gear S2 and outputted to the second wheel 10b through the second planet carrier C2 and the second output shaft 12b. In the instant case, since the first and second motor-generators 20a and 20b operate at different speeds, the first and second wheels 10a and 10b rotate at different speeds such that the electric vehicle turns.

Turning at High Speed

The high-speed turning of the electric vehicle is implemented in the same way as the low-speed turning except for whether the brake BK operates. Because the brake BK is disengaged when the electric vehicle turns at a high speed, the electric vehicle may turn at a relatively high speed.

Figure 3:
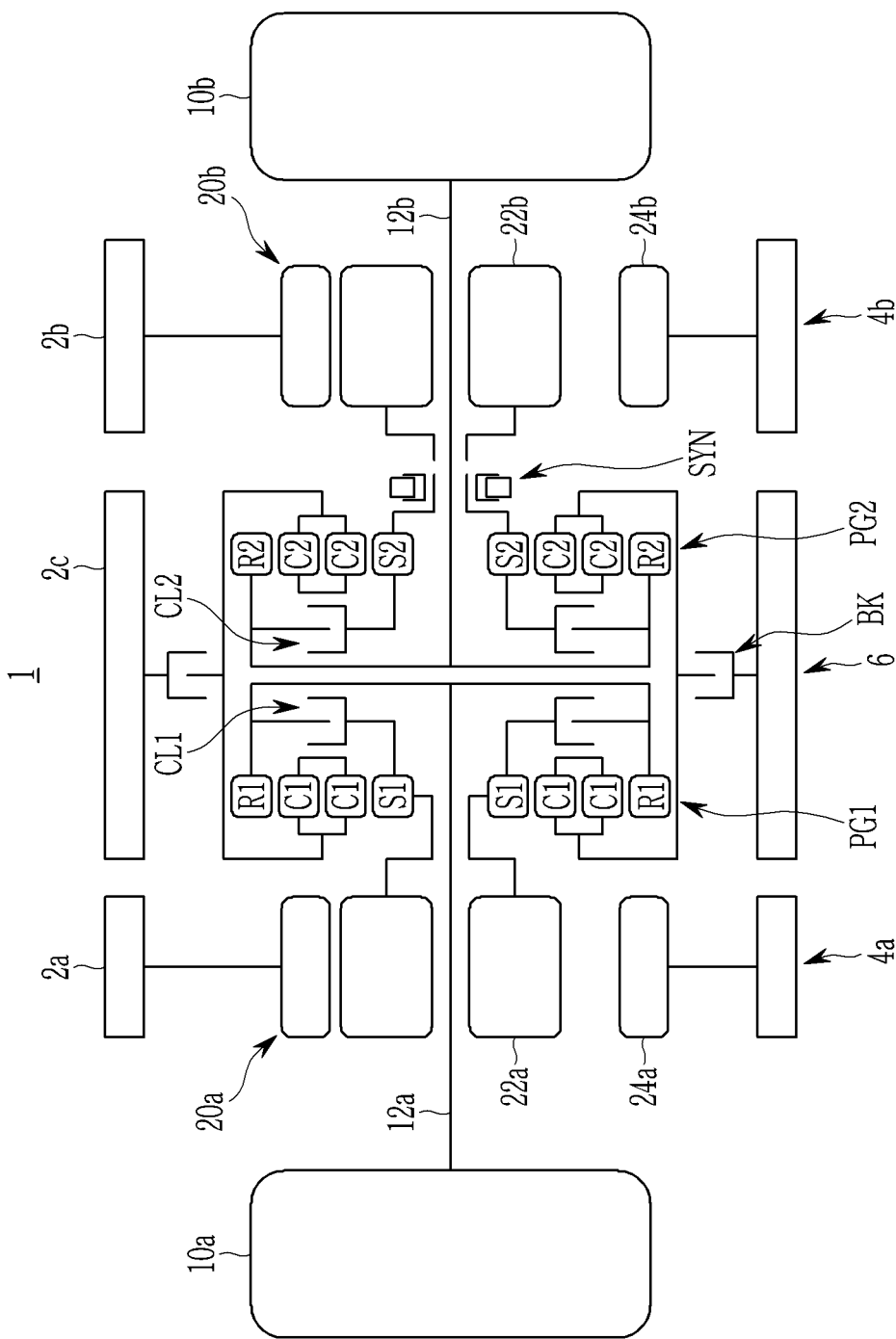
FIG. 3 is a configuration view exemplarily illustrating a power transmission apparatus of an electric vehicle according to a second exemplary embodiment of the present invention.

FIG. 3 is a configuration view exemplarily illustrating a power transmission apparatus of an electric vehicle according to a second exemplary embodiment of the present invention.

As illustrated in FIG. 3, the power transmission apparatus 1 for an electric vehicle according to the second exemplary embodiment of the present invention is disposed between the first and second wheels 10a and 10b of the vehicle and includes the first and second motor modules 4a and 4b and the gear module 6. Because the first and second motor modules 4a and 4b according to the second exemplary embodiment of the present invention are identical to the first and second motor modules 4a and 4b according to the first exemplary embodiment of the present invention, a detailed description thereof will be omitted.

The gear module 6 includes the third housing 2c and the first planetary gear set and the second planetary gear set PG1 and PG2.

The third housing 2c may be a separate housing for the gear module 6 or a structure such as the vehicle body fixed in the vehicle.

The first planetary gear set PG1 is a double pinion planetary gear set including the first sun gears S1, the first planet carriers C1, and the first ring gears R1 as rotation elements. As well known to those skilled in the art, two sets of pinion gears are rotatably disposed between the first sun gears S1 and the first ring gears R1, one set of pinion gears engages with the first sun gears S1, the other set of pinion gears engages with the first ring gears R1 and one set of pinion gears, and the first planet carriers C1 rotatably support the two sets of pinion gears. In the instant case, the first sun gear S1 is the first rotation element and is connected to the first rotor 22a through the first motor shaft. The first ring gear R1 is the second rotation element and is connected to the first wheel 10a through the first output shaft 12a penetrating the first motor shaft and the first rotor 22a. The first ring gear R1 is selectively connectable to the first sun gear S1 through the first clutch CL1. The first planet carrier C1 is the third rotation element and is selectively connectable to the third housing 2c through the brake BK. In the instant case, the first clutch CL1 locks up the first planetary gear set PG1 by connecting the two rotation elements, e.g., the first sun gear S1 and the first ring gear R1 of the first planetary gear set PG1.

The second planetary gear set PG2 is a double pinion planetary gear set including the second sun gears S2, the second planet carriers C2, and the second ring gears R2 as rotation elements. As well known to those skilled in the art, two sets of pinion gears are rotatably disposed between the second sun gears S2 and the second ring gears R2, one set of pinion gears engages with the second sun gears S2, the other set of pinion gears engages with the second ring gears R2 and one set of pinion gears, and the second planet carriers C2 rotatably support the two sets of pinion gears. In the instant case, the second sun gear S2 is the fourth rotation element and is connected to the second rotor 22b through the second motor shaft. The second ring gear R2 is the fifth rotation element and is connected to the second wheel 10b through the second output shaft 12b penetrating the second motor shaft and the second rotor 22b. The second ring gear R2 is selectively connectable to the second sun gear S2 through the second clutch CL2. The second planet carrier C2 is the sixth rotation element and is selectively connectable to the third housing 2c through the brake BK. In the instant case, the second clutch CL2 locks up the second planetary gear set PG2 by connecting the two rotation elements, e.g., the second sun gear S2 and the second ring gear R2 of the second planetary gear set PG2.

In the exemplary embodiment, the first planet carrier C1 is connected to the second planet carrier C2.

In the exemplary embodiment, the example has been described in which the second sun gear S2 is selectively connectable to the second rotor 22b through the synchronous device SYN. The second sun gear S2 may be connected to the second rotor 22b through the second motor shaft, and the first sun gear S1 may be selectively connectable to the first rotor 22a through the synchronous device SYN.

When at least one of the first and second motor-generators 20a and 20b generates driving power, the gear module 6 converts the driving power and transmits the converted power to the first and second wheels 10a and 10b through the first and second output shafts 12a and 12b.

Because an operation of the power transmission apparatus of an electric vehicle according to the second exemplary embodiment of the present invention is very similar to the operation of the power transmission apparatus of an electric vehicle according to the first exemplary embodiment of the present invention, a detailed description thereof will be omitted.

Figure 4:
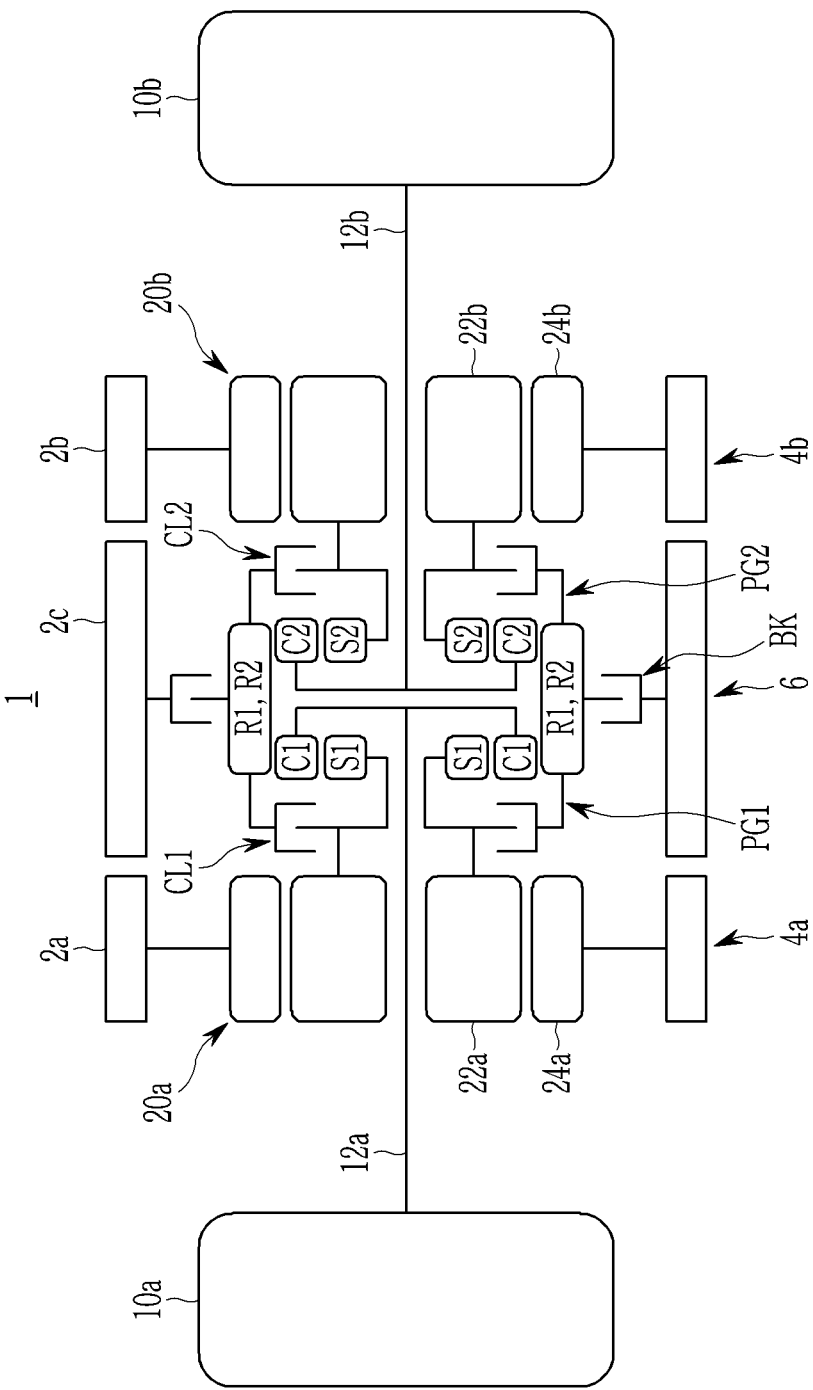
FIG. 4 is a configuration view exemplarily illustrating a power transmission apparatus of an electric vehicle according to a third exemplary embodiment of the present invention.

FIG. 4 is a configuration view exemplarily illustrating a power transmission apparatus of an electric vehicle according to a third exemplary embodiment of the present invention.

As illustrated in FIG. 4, the power transmission apparatus 1 for an electric vehicle according to the third exemplary embodiment of the present invention is disposed between the first and second wheels 10a and 10b of the vehicle and includes the first and second motor modules 4a and 4b and the gear module 6. The first and second motor modules 4a and 4b and the gear module 6 according to the third exemplary embodiment of the present invention are very similar to the first and second motor modules 4a and 4b and the gear module 6 according to the first exemplary embodiment of the present invention. However, in the power transmission apparatus 1 according to the third exemplary embodiment of the present invention, the second sun gear S2 is connected to the second rotor 22b through the second motor shaft. That is, in the power transmission apparatus 1 according to the third exemplary embodiment of the present invention, no synchronous device SYN is provided between the second sun gear S2 and the second rotor 22b.

Because the configuration and operation of the power transmission apparatus 1 according to the third exemplary embodiment of the present invention are very similar to the configuration and operation of the power transmission apparatus 1 according to the first exemplary embodiment of the present invention except for whether the synchronous device SYN is present and the operation of the synchronous device SYN, a detailed description thereof will be omitted.

Figure 5:
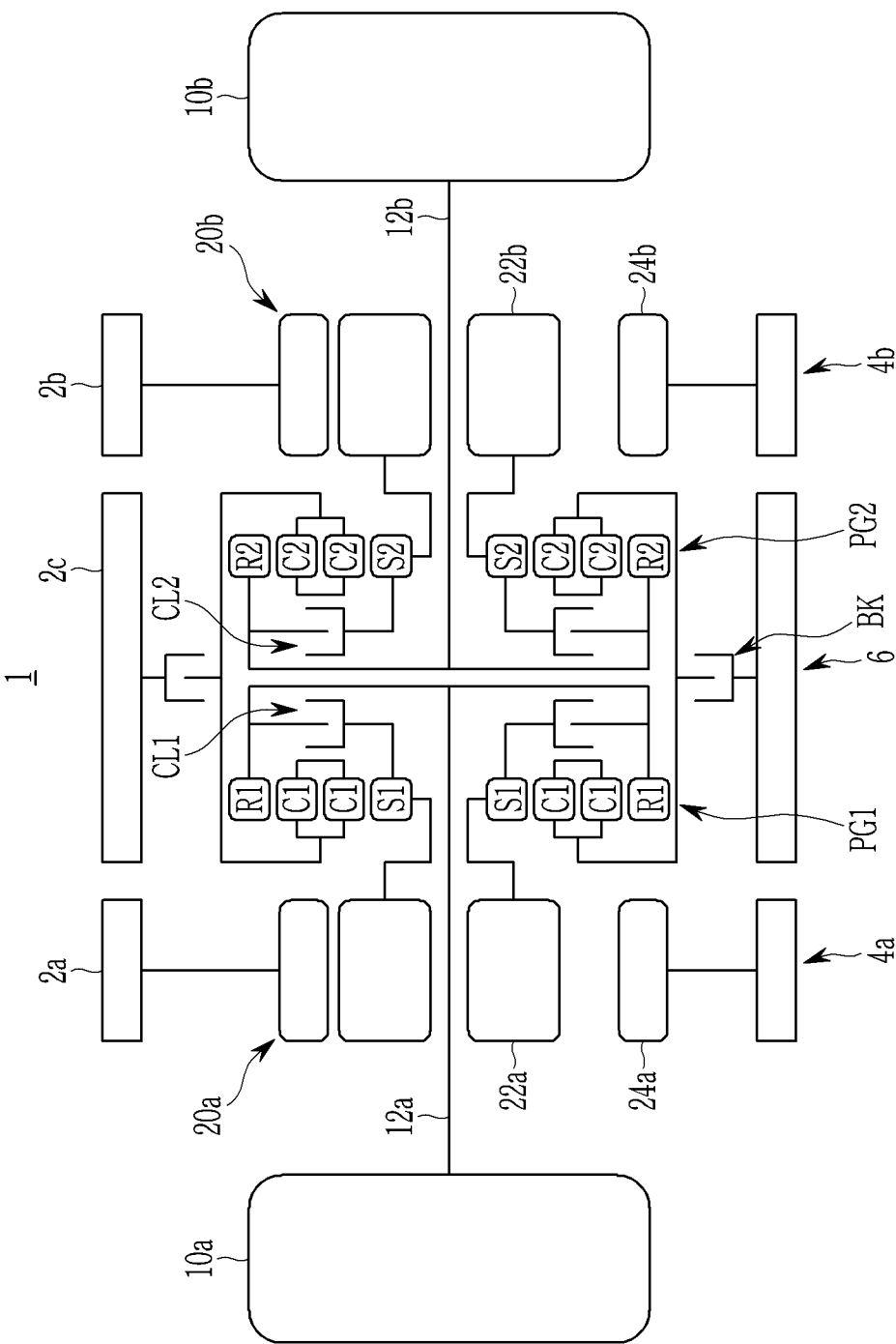
FIG. 5 is a configuration view exemplarily illustrating a power transmission apparatus of an electric vehicle according to a fourth exemplary embodiment of the present invention.

FIG. 5 is a configuration view exemplarily illustrating a power transmission apparatus of an electric vehicle according to a fourth exemplary embodiment of the present invention.

As illustrated in FIG. 5, the power transmission apparatus 1 for an electric vehicle according to the fourth exemplary embodiment of the present invention is disposed between the first and second wheels 10a and 10b of the vehicle and includes the first and second motor modules 4a and 4b and the gear module 6. The first and second motor modules 4a and 4b and the gear module 6 according to the fourth exemplary embodiment of the present invention are very similar to the first and second motor modules 4a and 4b and the gear module 6 according to the second exemplary embodiment of the present invention. However, in the power transmission apparatus 1 according to the fourth exemplary embodiment of the present invention, the second sun gear S2 is connected to the second rotor 22b through the second motor shaft. That is, in the power transmission apparatus 1 according to the fourth exemplary embodiment of the present invention, no synchronous device SYN is provided between the second sun gear S2 and the second rotor 22b.

Because the configuration and operation of the power transmission apparatus 1 according to the fourth exemplary embodiment of the present invention are very similar to the configuration and operation of the power transmission apparatus 1 according to the second exemplary embodiment of the present invention except for whether the synchronous device SYN is present and the operation of the synchronous device SYN, a detailed description thereof will be omitted.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the claims appended hereto and their equivalents.

What is claimed is:

1. A power transmission apparatus of a vehicle, the power transmission apparatus comprising:
    a first motor-generator including a first stator fixed to a first housing, and a first rotor rotatably disposed in the first stator;
    a second motor-generator including a second stator fixed to a second housing, and a second rotor rotatably disposed in the second stator;
    a first planetary gear set including a first rotation element connected to the first rotor, a second rotation element connected to a first wheel, and a third rotation element;
    a second planetary gear set including a fourth rotation element engaged to the second rotor, a fifth rotation element connected to a second wheel, and a sixth rotation element connected to the third rotation element;
    a first clutch configured to selectively lock up the first planetary gear set by selectively connecting two rotation elements among the first, second, and third rotation elements;
    a second clutch configured to selectively lock up the second planetary gear set by selectively connecting two rotation elements among the fourth, fifth, and sixth rotation elements; and
    a brake configured to selectively fix the connected third and sixth rotation elements to a third housing,
    wherein the first planetary gear set and the second planetary gear set each are a single pinion planetary gear set,
    wherein the first rotation element is a first sun gear, the second rotation element is a first planet carrier, the third rotation element is a first ring gear,
    wherein the fourth rotation element is a second sun gear, the fifth rotation element is a second planet carrier, and the sixth rotation element is a second ring gear,
    wherein the two rotation elements among the first, second, and third rotation elements include the first planet carrier and the first ring gear,
    wherein the two rotation elements among the fourth, fifth, and sixth rotation elements include the second planet carrier and the second ring gear,
    wherein the first clutch selectively connects the first planet carrier and the first ring gear, and
    wherein the second clutch selectively connects the second planet carrier and the second ring gear.

2. The power transmission apparatus of claim 1,
    wherein the first and second wheels are a pair of front wheels of the vehicle, and
    wherein the power transmission apparatus is disposed between the first and second wheels.

3. The power transmission apparatus of claim 1,
    wherein the first housing and the first motor-generator form a first motor module,
    wherein the second housing and the second motor-generator form a second motor module, and
    wherein the first planetary gear set and the second planetary gear set, the first and second clutches, the brake, and the third housing form a gear module.

4. The power transmission apparatus of claim 3, wherein the gear module is disposed between the first and second motor modules.

5. The power transmission apparatus of claim 1, further including:
    a synchronous device disposed between the fourth rotation element and the second rotor.

6. The power transmission apparatus of claim 5, wherein the synchronous device is a dog clutch or a synchronizer.

7. The power transmission apparatus of claim 1, wherein the first ring gear and the second ring gear are integrated.

8. The power transmission apparatus of claim 1, further including:
    a synchronous between the second sun gear and the second rotor.

9. The power transmission apparatus of claim 8, wherein the synchronous device is a dog clutch or a synchronizer.

10. The power transmission apparatus of claim 1,
    wherein the two rotation elements among the first, second, and third rotation elements include the first sun gear and the first ring gear,
    wherein the two rotation elements among the fourth, fifth, and sixth rotation elements include the second sun gear and the second ring gear,
    wherein the first clutch selectively connects the first sun gear and the first ring gear, and
    wherein the second clutch selectively connects the second sun gear and the second ring gear.

11. The power transmission apparatus of claim 10, wherein the second sun gear is fixedly connected to the second rotor.

12. The power transmission apparatus of claim 1,
    wherein the first planetary gear set and the second planetary gear set each are a double pinion planetary gear set,
    wherein the first rotation element is a first sun gear, the second rotation element is a first ring gear, the third rotation element is a first planet carrier,
    wherein the fourth rotation element is a second sun gear, the fifth rotation element is a second ring gear, and the sixth rotation element is a second planet carrier.

13. The power transmission apparatus of claim 12, wherein the first planet carrier is connected to the second planet carrier.

14. The power transmission apparatus of claim 13,
wherein the two rotation elements among the first, second, and third rotation elements include the first sun gear and the first ring gear
wherein the two rotation elements among the fourth, fifth, and sixth rotation elements include the second sun gear and the second ring gear,
wherein the first clutch selectively connects the first sun gear and the first ring gear, and
wherein the second clutch selectively connects the second sun gear and the second ring gear.

15. The power transmission apparatus of claim 14, further including:
a synchronous device disposed between the first sun gear and the first rotor or between the second sun gear element and the second rotor.

16. The power transmission apparatus of claim 15, wherein the synchronous device is a dog clutch or a synchronizer.

17. The power transmission apparatus of claim 15, wherein the second sun gear is fixedly connected to the second rotor.

18. The power transmission apparatus of claim 1, wherein the first, second, and third housing are assembled with one another as a single housing.

* * * * *